Jan. 16, 1934.  J. W. CONNORS  1,944,069
TRANSMISSION GEARING FOR AUTOMOTIVE VEHICLES
Filed Nov. 10, 1932  2 Sheets-Sheet 1
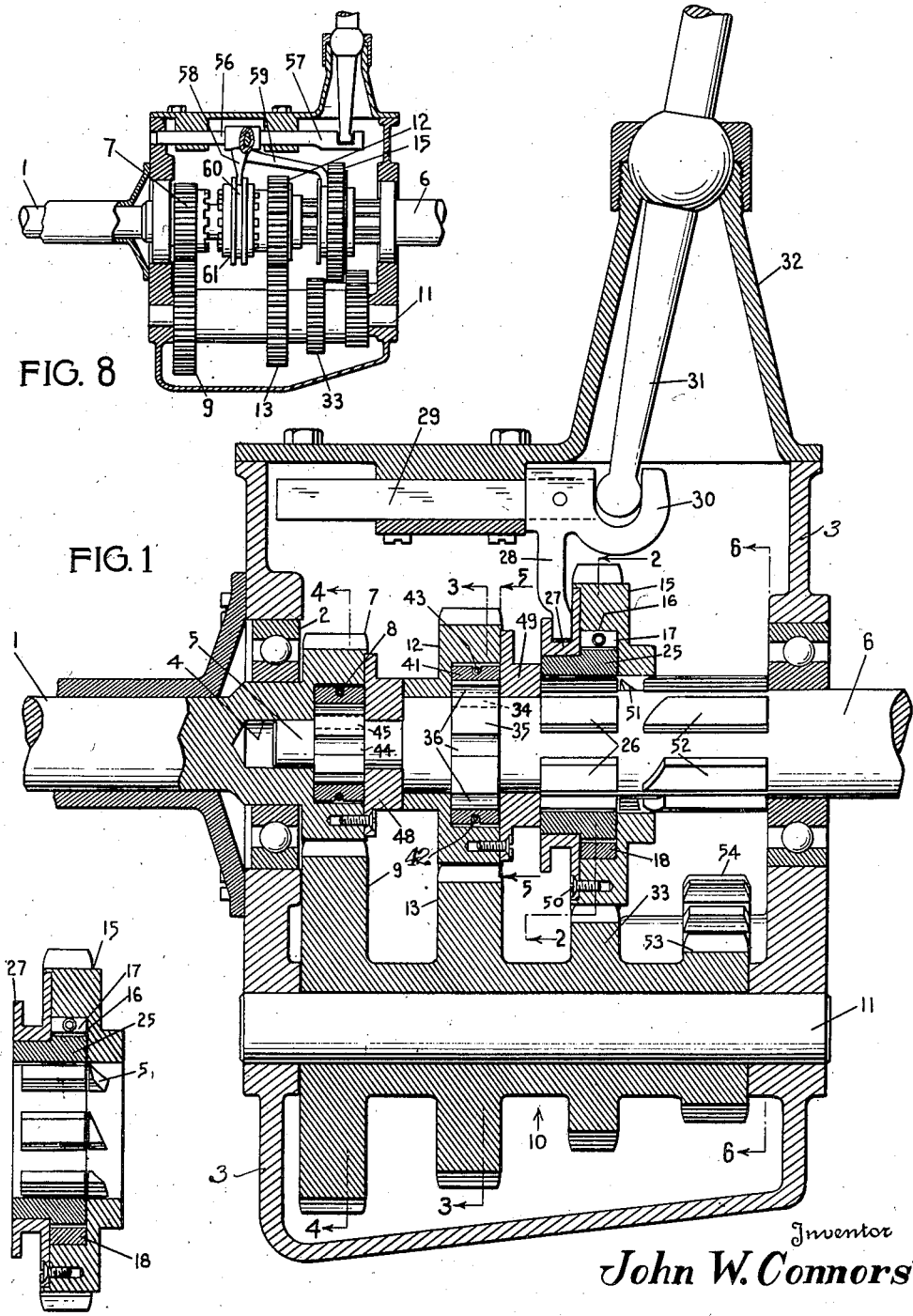
Inventor
John W. Connors Jan. 16, 1934.   J. W. CONNORS   1,944,069
TRANSMISSION GEARING FOR AUTOMOTIVE VEHICLES
Filed Nov. 10, 1932   2 Sheets-Sheet 2

Inventor
John W. Connors
By *J. C. Hutchinson Jr.*
Attorney

Patented Jan. 16, 1934

1,944,069

UNITED STATES PATENT OFFICE 1,944,069

TRANSMISSION GEARING FOR AUTOMOTIVE VEHICLES

John W. Connors, Washington, D. C.

Application November 10, 1932
Serial No. 642,095

6 Claims. (Cl. 74—59)

This invention relates to gearing and more particularly to transmission gearing for automotive vehicles.

Heretofore, gearing of this type, admitting of three speeds forward and reverse, involved four manipulations of the shift lever and the necessary operation of the clutch with each operation of the shift lever.

It is not only one object of this invention to minimize the necessary manual effort involved in the manipulation of the shift lever and the clutch but to provide simple and inexpensive mechanism which requires but a single movement of the gear shift lever for all three forward speeds and a single operation of the clutch, the remaining two forward speeds being brought into play by speed responsive mechanism automatically without any effort whatever upon the part of the operator or without indication that such automatic operation is taking place.

A further object of this invention is the provision of a transmission mechanism in which the operator may by shifting his gear shift lever into low speed cause an automatic operation of the pilot shaft throughout low, intermediate and high gears whereby only a single shift of the gear shift lever is necessary.

A still further object of the invention is the provision of a transmission mechanism which may be operated automatically or manually.

A further object of the invention is the provision of mechanism by which the ordinary so-called constant mesh automotive transmission may be converted from a manual gear shifting mechanism to one in which after the mechanism is brought from neutral to first-gear position will automatically operate as the speed of the engine is accelerated to connect intermediate and high gears.

Still another object of the invention is the provision of a transmission mechanism in which the operator may secure "free wheeling" when operating in either low, intermediate or high gear.

Further objects of the invention will appear as the following specific description is read in connection with the accompanying drawings which form a part of this application and in which Figure 1 is a vertical longitudinal section taken through the ordinary transmission housing showing the improved mechanism therein;

Figure 7 is a detail vertical sectional view of the initial gear on the pilot shaft; and Figure 8 discloses a modified form of the invention in which the usual dental tooth clutch is employed between high and intermediate gears on the clutch shaft and pilot shaft respectively of the well known constant mesh type of transmission commonly used.

Figure 6:
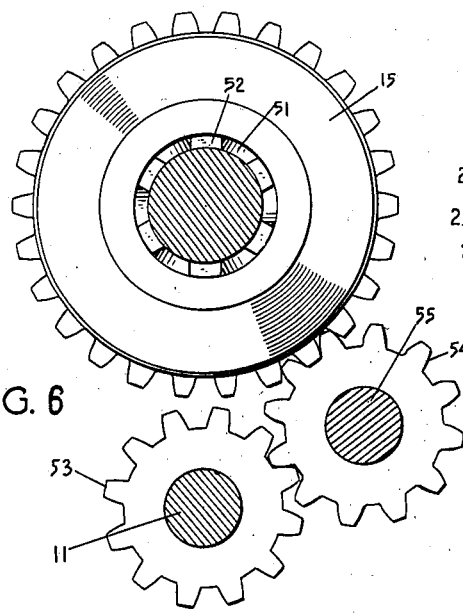
Figure 6 is a sectional view taken on the line 6—6 of Fig. 1.

Referring more particularly to the drawings, 1 represents the drive or clutch shaft journalled, as is usual, in bearing 2 formed in the forward end of the usual transmission housing 3 and provided with a bearing 4 receiving the reduced forward end 5 of the pilot or main transmission shaft 6. The clutch shaft 1 carries as is usual, a pinion or gear 7 which, in this instance, is recessed from its inner end, as shown at 8, for a purpose to be hereinafter described. This gear 7 meshes constantly with the tertiary driving gear 9 of the gear cluster, generally indicated at 10 and which is fast on the jack or counter-shaft 11 also journalled in bearings formed in the transmission housing and generally below the pilot shaft.

Figure 2:
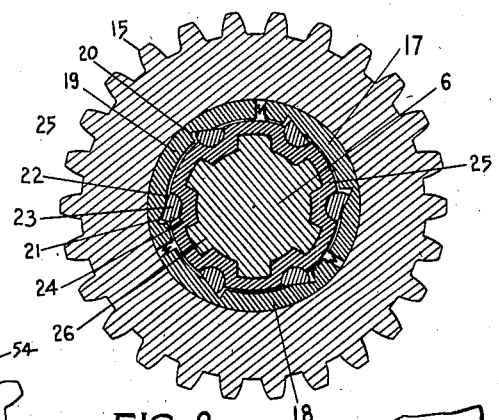
Figure 2 is a sectional view taken on the line 2—2 of Fig. 1.
Figure 3:
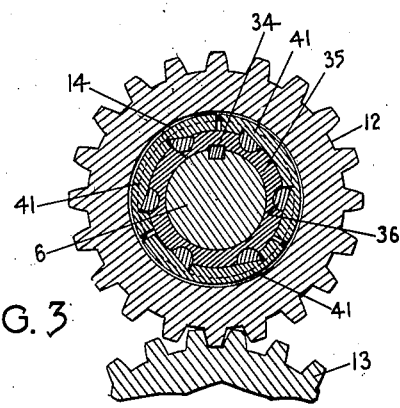
Figure 3 is a sectional view taken on the line 3—3 of Fig. 1.
Figure 4:
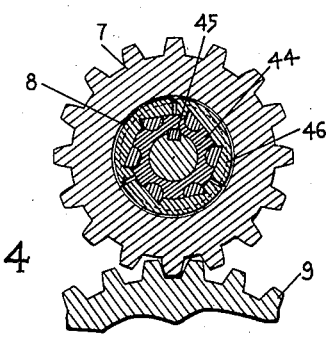
Figure 4 is a sectional view taken on the line 4—4 of Fig. 1.

Loosely mounted upon the pilot shaft 6 is the secondary driven gear 12 which meshes constantly with the secondary driving gear 13 and is also provided with a recess 14 for a purpose to be hereinafter described. The primary gear is illustrated at 15 and as shown in Figs. 2 and 7, is hollowed out or recessed at 16 to receive clutch elements 17, 18 and 19, each conforming on its exterior surface with the wall of the recess and having on its inner surface two or more substantially triangular recesses 20. These recesses provide, as shown in Fig. 2, cam surfaces 21 corresponding with similar cam surfaces 22 on freely mounted locking or binding members 23 having semi-circular inner surfaces and chordal outer faces constituting the cam surfaces 22 bearing against the cam surfaces 21. The inner semi-circular faces are seated in corresponding recesses 24 formed in a circular sleeve 25 held against rotation on the pilot shaft 6 by splines or keys 26.

The gear 15 also carries rigidly therewith a grooved collar 27 to receive the shifter fork 28 rigidly mounted on the shifter rod 29 and provided with a yoke 30 at its end to receive the ball end of the usual shift lever 31 mounted for universal movement, as is usual on the cover 32 of the transmission housing. The shifter rod, shifter fork and shift lever require no further description, as they are of customary type.

The drive from the drive shaft or clutch shaft is, as readily will be seen, from the pinion or gear 7 integral with the clutch shaft through the tertiary driving gear and the cluster of gears to the primary driving gear 33 which meshes with the primary driven gear on the pilot shaft. When the clutch shaft is rotated the primary driven gear 15 will be revolved around the clutch elements 17, 18 and 19 and by reason of the frictional engagement of the lowermost one of such elements with the inner wall of the recess will cause such clutch element to move with the gear and the cam surfaces 21 thereof to ride upon the cam surfaces of the binding members 23, thus forcing this particular clutch element outwardly and into tight frictional engagement with the inner wall of the recess of the gear 15. As this gear is thus rotated, the other clutch elements will be brought into engagement with the gear similarly, locking the gear to the sleeve 25 and causing the rotation of the pilot or main transmission shaft, the gear rotating in a clockwise direction, but at a slower rate of speed than the clutch shaft driving the car in what is commonly known as first gear. The foregoing operation is all that is necessary to ensure a consecutive and sequential change of gears from first to intermediate and then to high, as will be now explained.

The pilot shaft 6 is provided with a spline or key 34 which locks thereto a sleeve 35 similar to the sleeve 25. This sleeve is provided with a plurality of semi-circular sockets 36 in which are seated locking or binding members 37 having chordal outer faces providing cam surfaces 38 which engage and rest on corresponding cam faces 39 formed by triangular notches 40 in the clutch elements 41 of which there are preferably three surrounding the sleeve 35. Each of these clutch elements, as is shown in Figs. 5 and 1, is provided with peripheral grooves 42 which constitute a circumferential groove around all of the clutch members which receives a looped contracting spiral spring 43 tending at all times to draw the clutch members inwardly toward the sleeve 35.

Figure 5:
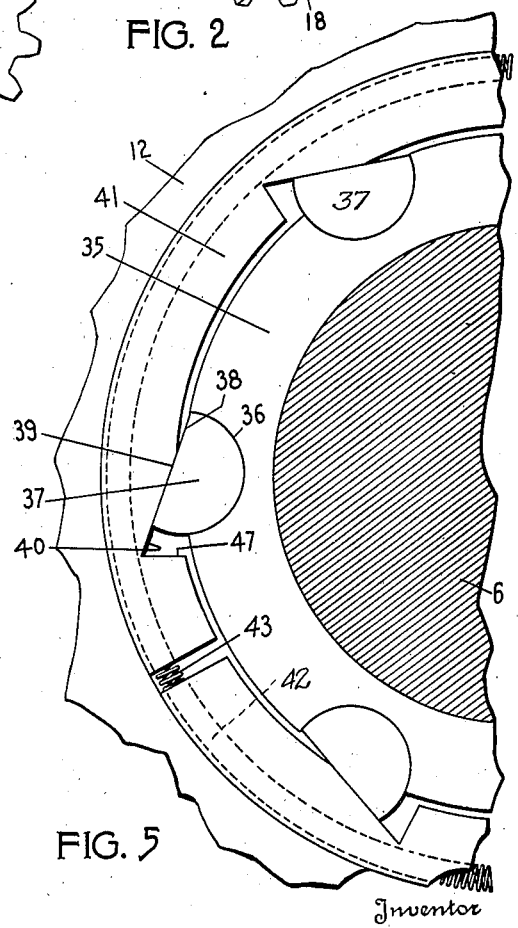
Figure 5 is a sectional view taken on the line 5—5 of Fig. 1; on an enlarged scale.

The foregoing arrangement has been described as applied to the secondary driven gear and a similar arrangement of parts is found within the gear 7 on the clutch shaft wherein a sleeve 44 is keyed to the pilot shaft 6 by key 45 and is provided with a plurality of semicircular sockets around its periphery to receive locking or binding members similar to those indicated at 37 fitting into notches similar to 40 in Fig. 5 in clutch members identical with those indicated at 41, but of somewhat smaller size. These clutch members also are provided with peripheral grooves receiving a looped contracting spiral spring with somewhat stronger tension than the spring indicated at 43 whereby the clutch elements 46 will not be brought into engagement with the inner wall of the recess in gear 7 until sometime after gear 12 has been locked to the pilot shaft and the speed of the vehicle has materially increased, as will be understood from what follows.

When the clutch shaft has started to rotate, the drive is through gear 7, gear 9, gear 33 and gear 15 which is loose upon the pilot shaft. Immediately that gear 15 starts to rotate clutch elements lock the sleeve 25 to the gear and thus the pilot shaft or main transmission shaft is rotated and the vehicle started in motion. As the operator accelerates the speed of his engine and the vehicle picks up speed, the sleeve 35 will be rotated carrying with it the clutch elements 41. When a sufficient speed has been attained, centrifugal action throws the clutch members outwardly against the tension of the spring member 43 and the binding or locking members 37 engage the substantially radial shoulders 47 in the triangular notches and the secondary driven gear is thus locked to the sleeve which is in turn keyed to the pilot shaft. The pilot shaft is, therefore, driven at a higher ratio of speed and thus the speed of the vehicle is accelerated. As the operator supplies additional fuel to the engine and the speed of the car is accelerated, clutch elements 46 are automatically thrown, by centrifugal force, into engagement with the gear 7 and thus the gear 7 and the clutch are locked directly to the main transmission or pilot shaft 6. The car is then driven at high speed.

It will be noted that when the clutch elements of secondary gear on the pilot shaft are thrown into engagement with said gear that the speed of such gear and consequently the speed of the pilot shaft is materially increased thereover and as a consequence the clutch elements in the primary gear 15 are disengaged from such gear, the drive then being through the clutch shaft gears 7, 9 and 13 to the secondary driven gear 12. As the operator accelerates the speed of his engine by supplying more fuel thereto, the clutch elements in the tertiary driving gear 7 connect the pilot shaft to such gear so that said pilot shaft is driven direct from the clutch shaft. As the pilot shaft is now rotated at a higher rate of speed than the gear 12, the clutch elements in gear 12 are automatically disconnected and although gear 12 continues to rotate by reason of its being meshed with gear 13, the drive of the driven or pilot shaft is direct from the clutch shaft and the clutch elements within gear 12 are rotated therein without driving said gear.

When driving the pilot shaft through either gear 15, 12 or direct from the clutch shaft the operator by suddenly releasing his accelerator pedal so as to cause disconnection of the clutch elements may produce an idle rotation of the pilot shaft within all of the gears and thus obtain what is commonly known as free wheeling.

These automatic operations take place with such ease and smoothness, as the operator merely presses downwardly upon the accelerator pedal, that the change from low to intermediate and from intermediate to high gear is not noticeable.

In order to retain the clutch elements and the binding or locking members in the respective gears 7, 12 and 15, I provide with respect to gear 7 a retaining collar 48 which is secured to gear 7 by screws or in any suitable manner and loosely surrounds the pilot shaft. With respect to gear 12 a similar collar 48—49 is secured thereto.

The collar 27 for the shifter fork is secured to the gear 15 by screws 50 and is loosely mounted, of course, on the sleeve 25.

As shown in Figs. 1 and 7, the gear 15 is provided with short splines 51 corresponding with the splines 26 and 52 on the pilot shaft 6. The latter splines are shown separated some distance from the splines 26, so that the short splines 51 on the gear 15 may rotate between the two freely when gear 15 is idling upon the pilot shaft. When gear 15, however, is shifted rearwardly into reverse position, the short splines 51 on gear 15 will engage between the splines 52 on the pilot shaft and the spline ways of the sleeve 25 will receive the splines 52, so that the gear and sleeve are positively connected to the pilot shaft and are driven through the instrumentality of the pinion 53 on the gear cluster 10 and the idler pinion 54 journalled on shaft 55 and meshing with gear 15 when this latter gear has its splines 51 meshing with the spline ways or grooves between the splines on the pilot shaft. The gear 15 and pilot shaft 6 are then rotated in a counter clockwise direction.

In the modification of Fig. 8, the arrangement of parts so far as the primary, secondary and high gears are concerned, is identical. In this form, however, two shifter rods 56 and 57 are employed, the former carrying a clutch fork 58 and the latter carrying a gear shifting fork 59 similar in operation to the shifter fork 28. The shifter fork 58 engages within an annular groove 60 in the dental tooth clutch 61 which is keyed upon the pilot shaft and has its opposite castellated clutch faces arranged to engage similar castellated clutch faces on the secondary and high gears 12 and 7 respectively.

Gears 7 and 12 as well as gear 15 in this form of device are identical with the type of gear disclosed in Fig. 1 in so far as the clutching elements therein are concerned, and while in both instances I have disclosed gears with ordinary spur teeth, it is preferable to make gears 7 and 12 and the corresponding gears 9 and 13 with helical teeth on account of the reduction in noise.

With the form shown in Fig. 8, the operator may optionally control the shifting of the gears manually or automatically. If he wishes to get away from the standing position rapidly, he will after throwing the primary gear 15 into mesh with the primary gear 33 on the cluster and letting in the clutch gradually depress his accelerator pedal thus speeding up the clutch shaft and causing first the pilot shaft to be driven through the gear 15, then through the gears 13 and 12 and then direct from the clutch shaft to the pilot shaft, the speed responsive clutch members in gears 12 and 7 clutching into these gears automatically as the speed of the engine increases or by manipulation of the gear shift lever he may throw the gear 15 into mesh with the gear 33 which will start the rotation of the pilot shaft almost immediately that the clutch is permitted to engage, after which by manipulation of the gear shift lever the dental tooth clutch which is splined on the pilot shaft is first thrown into engagement with the clutch face on the gear 12 and then into engagement with the clutch face on the gear 7. It is, of course, to be understood that if the operator accelerates the speed of his engine too rapidly that the automatic shifting will take place before any manual shifting can be accomplished, but if the vehicle is set in motion slowly until it acquires a given speed, the operator can manually shift from second to high.

It will be noted that the position of the dental tooth clutch 61 in Fig. 8 is such that the vehicle will be driven in second gear and it is to be understood that when in neutral position this clutch is arranged between and out of engagement with the clutch devices on the gears 7 and 12.

It will be noted that in the operation of the modification of Fig. 8 the operator by proper manipulation of his gear shift lever may throw the primary gear 15 into neutral position and throw the dental tooth clutch into engagement with the secondary gear 12 while going down a grade and thus utilize the engine as a brake, of course removing his foot from the accelerator pedal as is customary in such operations.

What I claim is:—

1. In a gear changing mechanism having a driving shaft, a driven shaft having gears thereon in alignment with said driving shaft and in which a counter shaft carries gear wheels constantly in mesh with gears on said shafts for transmitting power in variable ratio from the driving to the driven shaft, speed responsive means for successively coupling the gear wheels to the driven shaft and said shafts to each other, said means comprising a sleeve within each gear splined on the driven shaft, a centrifugally operable driving member adapted to be moved into contact with said gear and surrounding said sleeve, and clutch members carried by the sleeve and adapted to lock said driving member into radial driving contact with said gear.

2. In a constant mesh transmission gearing for automotive vehicles having a clutch shaft, a pilot shaft, a gear fixed on the clutch shaft, gears loosely mounted on the pilot shaft, a cluster gear having elements intergeared with said gears on the clutch and pilot shafts, means comprising independent devices within the gears on the pilot shaft operating successively to lock said gears to the pilot shaft for rotation therewith, said means comprising a sleeve within each gear fixed on the pilot shaft, a speed responsive split ring member surrounding said sleeve adapted to be moved into contact with said gear, yielding means for normally maintaining said member out of driving engagement with said gear, and movable clutch members carried by said sleeve adapted to lock said driving member into radial driving contact with said gear.

3. In a transmission gearing having a shaft and a plurality of gears rotatively carried thereby, independent speed responsive means associated with each gear to successively connect said gears in driving relation with said shaft, said means comprising a sleeve within each gear fixed to said shaft for rotation therewith, a driving member surrounding said sleeve adapted to be moved into contact with said gear and provided on its inner face with a substantially triangularly shaped recess, one surface of which is disposed at substantially right angle to said shaft and the other at a tangent thereto, and movable clutch members carried by said sleeve and adapted to engage the recesses of said driving member to press said driving member radially into contact with said gear.

4. In a constant mesh transmission gearing for automotive vehicles, having a driving shaft, a driven shaft, a gear fixed to the driving shaft, gears loosely mounted on the driven shaft, a cluster gear having elements intergeared with said gears on the driving and driven shafts for transmitting power in variable ratio from the driving to the driven shaft, means consisting of a speed responsive device for independently and successively coupling the gear wheels to the driven shaft and the shafts to each other comprising a sleeve within each gear fixed to the driven shaft, a split ring member surrounding said sleeve adapted to be moved into contact with said gears and provided on its inner face with a substantially triangularly shaped recess, one surface being disposed to provide abutments at a substantial right angle to said shaft and the other inclined at a tangent thereto, yielding means for normally maintaining said member out of driving engagement with said gear, and movable clutch members fitted in recesses in said sleeve adapted to engage said abutments and press said driving member radially into driving contact with said gear at a predetermined speed and to slide freely over the inclined faces to disengage said gear when the driven shaft rotates at a greater speed than the driving shaft.

5. In an automatic constant mesh transmission gearing having a driving shaft, a driven shaft in alignment therewith and a parallel counter-shaft and in which gear wheels fixed on the driving and counter-shaft mesh with normally free gears on the driven shaft, independent speed responsive means for successively connecting the gears on said driven shaft in driving relation therewith comprising a sleeve fixed to said shaft, a centrifugally operable driving member adapted to be moved radially into engagement with said gears surrounding said sleeve, means carried by said sleeve adapted to lock said driving member into driving contact with said gear at a predetermined speed and to disengage said gear when the driving shaft rotates at a greater speed than the driven shaft, and means controlling the operation of said centrifugally operable means associated therewith for normally holding the same out of contact with said gear.

6. In an automatic constant mesh transmission gearing having a driving shaft, a driven shaft in alignment therewith and a parallel counter-shaft and in which gear wheels fixed on the driving and counter-shaft mesh with normally free gears on the driven shaft, independent speed responsive means for successively connecting the gears on said driven shaft in driving relation therewith comprising sleeves fixed to said shaft, centrifugally operable driving members adapted to be moved radially into engagement with said gears surrounding said sleeves, clutch members in association with each of the gears on the driven shafts and carried by said sleeves adapted to successively lock said driving members into driving contact with their associated gear when the driven shaft reaches a predetermined speed and to disengage said gear when said driving shaft rotates at a greater speed than the driven shaft, and to connect the next succeeding gear on the driven shaft with said shaft until the driven shaft reaches a speed equal to the speed of the driving shaft, and means associated with said centrifugally operable member for controlling its operation and for normally holding the same out of contact with said gear.

JOHN W. CONNORS.